United States Patent [19]

Otto

[11] 4,216,177

[45] Aug. 5, 1980

[54] POLYURETHANE FOAM PRODUCT AND PROCESS OF MANUFACTURE THEREOF FROM THERMOSETTING FROTHED MIXTURE

[75] Inventor: Jeffrey B. Otto, Brooklyn, Conn.

[73] Assignee: Rogers Corporation, Rogers, Conn.

[21] Appl. No.: 39,451

[22] Filed: May 16, 1979

Related U.S. Application Data

[63] Continuation of Ser. No. 874,774, Feb. 3, 1978, abandoned, which is a continuation of Ser. No. 619,389, Oct. 3, 1975, abandoned.

[51] Int. Cl.² ............................................. B29D 27/04
[52] U.S. Cl. ..................................... 264/25; 264/45.5;
    264/45.8; 264/50; 425/4 C; 521/111; 521/133;
    521/174
[58] Field of Search ...................... 264/25, 45.5, 45.8,
    264/50, DIG. 14, 48, 46.3, 54; 425/4 C, ;
    156/247; 521/111, 133, 174

[56] References Cited

U.S. PATENT DOCUMENTS

| | | | |
|---|---|---|---|
| 3,067,469 | 12/1962 | Yarrison | 156/247 X |
| 3,099,516 | 7/1963 | Hendrickson | 264/48 |
| 3,174,887 | 3/1965 | Voelker | 264/46.3 X |
| 3,216,849 | 11/1965 | Jacobs | 264/54 X |
| 3,240,845 | 3/1966 | Voelker | 264/46.3 X |
| 3,256,121 | 6/1966 | Abell | 156/247 X |
| 3,706,681 | 12/1972 | Bachura | 521/111 |
| 3,755,212 | 8/1973 | Dunlap et al. | 521/174 X |
| 3,772,224 | 11/1973 | Marlin et al. | 264/50 X |
| 3,816,233 | 6/1974 | Powers | 264/DIG. 14 |
| 3,821,130 | 6/1974 | Barron et al. | 521/133 X |
| 3,862,879 | 1/1975 | Barron et al. | 521/133 X |
| 3,925,526 | 12/1975 | Haas | 264/48 X |
| 3,926,700 | 12/1975 | Hopkins et al. | 264/50 X |
| 3,942,926 | 3/1976 | Bulloch | 264/48 X |

*Primary Examiner*—Philip Anderson

[57] ABSTRACT

A process is presented for forming flexible foam, polyurethane foam material having an integral skin, and polyurethane foam laminates, from a thermosetting frothed mixture, particularly a mechanically frothed mixture. Also presented is a flexible polyurethane foam material having an integral skin, and polyurethane foam laminates.

5 Claims, 2 Drawing Figures

POLYURETHANE FOAM PRODUCT AND PROCESS OF MANUFACTURE THEREOF FROM THERMOSETTING FROTHED MIXTURE

This is a continuation of application Ser. No. 874,774, filed Feb. 3, 1978, now abandoned, which was a continuation of application Ser. No. 619,389, filed Oct. 3, 1975, now abandoned.

BACKGROUND OF THE INVENTION

This invention relates to the field of frothed urethane foams. More particularly, this invention relates to the process of curing mechanically frothed polyurethane foams and to polyurethane foams and laminates formed from mechanically frothed mixtures.

Mechanically frothed urethane foams have been developed and are known in the art for a variety of uses, including but not limited to carpet backing, coated fabrics and foam tapes. Such materials are typically processed by coating a foam layer onto a substrate or carrier and curing in a circulating air oven. Curing conditions for such foam materials are generally regarded as extreme, primarily because of the low thermal conductivity of the foams and resultant long times or high temperatures necessary to raise the temperature of the entire body of foam to the level necessary to effect cross-linking of the polymer. Thus, substantial energy inputs are required to effect the desired cure in circulating air ovens, and this typical prior art curing system has been very inefficient from an energy standpoint. In addition, it has been difficult to maintain accurate gauge control when processing thick layers (on the order of 0.25 inches or more) of mechanically frothed foam, particularly when forming foam-fabric laminates; and the formation of an integral skin on one side of the cured foam material has not been practicable with prior art techniques. The reliance on convection heating in circulating air curing ovens has resulted in an extremely inefficient and expensive curing process for these foam materials. In addition, slow curing rates have also contributed to inefficient curing operations.

Gauge control of foam sheets has also been a recurring probelm in the prior art. This problem has been particularly noticeable with foam-fabric laminates where the fabric layer in contact with the foam may be irregularly shaped. Such irregularities have tended to be perpetuated into the final product rather than being accommodated in a foam layer.

For many end uses of mechanically frothed polyurethane foam materials, it would be desirable to form an integral skin one one side of the foam, i.e. to form an integral high density exterior layer on one side of the foam. Such integral skin formation has been highly impracticable with prior art circulating air oven curing techniques.

SUMMARY OF THE INVENTION

The above discussed and other problems of the prior art are overcome or reduced by the present invention in which curing of thermosetting frothed urethane foam, particularly mechanically frothed urethane foams, is accomplished by direct conduction heating and/or by a combination of conduction, radiant and convection heating, particularly with the use of sintering apparatus. Throughout this disclosure reference will be made to mechanically frothed urethane foam or mechanically frothed urethane forming mixtures. However, it will be understood that chemically frothed urethane foams which are slow reacting and can be shaped, worked or doctored after foaming and then thermoset can also be used in practicing the present invention.

In accordance with a preferred embodiment of the present invention a mechanically frothed urethane forming mixture is introduced onto a moving release paper carrier and doctored to the desired thickness by any suitable coating device such as a knife over table coater (doctoring knife). The release paper carrier is conveyed over and is brought into direct contact with a heated metal platen to heat the foam by conduction heating to cure the foam, and the foam is then transported through a cooling zone. After cooling, the cured foam and the carrier sheet are separated and separately wound. The upper surface of the foam layer is heated by radiant and convection heating from a heated platen or other heat source above the foam layer simultaneously with the conduction heating of the lower surface. Alternately, a second release paper carrier may be introduced into contact with the upper surface of the foam material and the upper heated platen may be brought into contact with the second sheet to provide additional conduction heating for the curing process. The present invention results in the creation of an integral skin on one or both of the upper or lower surfaces of the foam material by controlling the rate of introduction of heat to the surfaces at which the skin is to be formed. Also, if desired, fabric or other coatings may be laminated to either surface of the foam layer. The separation between the lower and upper heating platens may be adjusted to insure that both platens will be contacted by the assembly of foam and release paper and/or laminate as it is being cured, whereby a much more precise control of the gauge of the finished material may be realized than in prior art.

One of the principal advantages of the present invention is the improved and increased processing efficiency in forming the foam material. The inefficient convection heating process of the circulating air oven of the prior art is eliminated and replaced by more efficient conduction heating and radiant heating techniques.

Significantly improved skin control may also be realized by the present invention in that integral skins can easily be formed on either layer of the foam material and in desired thicknesses by controlling the rate of heat transfer to the surface on which the integral skin is to be formed.

Contacting of a release paper or laminate on the upper surface of the foam layer with a platen during processing also provides the significant advantages of improved lamination control and improved gauge control. Improved control in laminating a fabric layer to the foam is achieved by virtue of the fact that the upper platen applies pressure to cause the foam to conform to irregularities in the mating surface of the fabric so that those irregularities are absorbed and are not perpetuated into the finished product. Also, improved gauge control is achieved in that the foam layer may expand only until both platens are fully contacted, and further expansion merely results in slight compression of the air contained within the cells of the foam.

Accordingly, one object of the present invention is to provide a novel and improved process for forming polyurethane foam from a thermosetting frothed mixture.

Another object of the present invention is to provide a novel and improved process for forming polyurethane foam from a mechanically frothed mixture.

Still another object of the present invention is to provide a novel and improved process for forming polyurethane foam from a mechanically frothed mixture in a process which has improved energy efficiency.

Still another object of the present invention is to provide a novel and improved process for forming a polyurethane foam material from a mechanically frothed mixture, the material having improved integral skin characteristics and/or improved lamination characteristics.

Still another object of the present invention is to provide a novel and improved polyurethane foam product made from a mechanically frothed mixture in accordance with the process of the present invention.

Other objects and advantages of the present invention will be apparent to and understood by those skilled in the art from the following description and drawings.

BRIEF DESCRIPTION OF THE DRAWINGS

Referring now to the drawings, wherein like elements are numbered alike in the several figures.

DESCRIPTION OF THE PREFERRED EMBODIMENT

As pointed out above, throughout this disclosure reference will be made to mechanically frothed urethane foam or mechanically frothed urethane forming mixtures. However, it will be understood that chemically frothed urethane foams which are slow reacting and can be shaped, worked or doctored after foaming and then thermoset can also be used in practicing the present invention.

Figure 1:
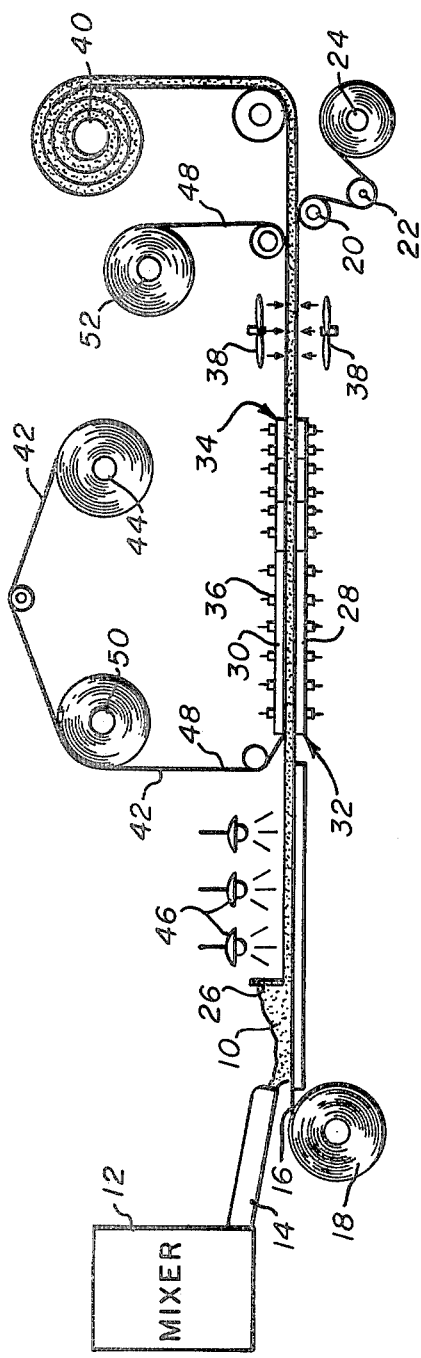
FIG. 1 is a diagrammatic view in side elevation of apparatus for use in practicing the method of the present invention and foring the product of the present invention.

The apparatus depicted in FIG. 1 is sintering machinery essentially as shown in the patents to Yarrison, U.S. Pat. No. 3,067,469 and Abell, U.S. Pat. No. 3,256,121, all of which are assigned to the assignee of the present invention, but with modifications to be described herein appropriate to the method of this invention. Reference may be had to such prior art patents for a background discussion of the construction and operation of such sintering equipment.

Any mechanically frothed polyurethane forming mixture may be used in the practice of the process and the forming of the products of the present invention. Reference is particularly made to U.S. Pat. Nos. 3,706,681; 3,755,212; 3,772,224; 3,821,130 and 3,862,879 for disclosures of mechanically frothed polyurethane forming mixtures which are particularly suitable for use in the present invention, which United States patents are incorporated herein by reference for inclusion of their disclosures herein. It will also be understood that any other mechanically frothed polyurethane forming mixture may be employed in the present invention.

The mechanically frothed polyurethane forming mixture 10, which will hereinafter be generally referred to as the foam mixture or the urethane forming mixture, is formed by mechanically beating an inert gas, such as air, into the mixture in standard mixing equipment 12 such as an SKG mixer, Hobart mixer or an Oakes mixer. The urethane forming mixture is formed, as shown in step A of FIG. 2, for example in accordance with the teachings of above referenced United States patents. The mixture is then mechanically frothed, as in step B of FIG. 2, to form a froth which is substantially chemically stable and is structurally stable but easily workable at ambient temperatures between 15° C. and 30° C. The consistency of this froth closely resembles that of aerosol dispensed shaving cream.

The foam mixture 10 is then transferred at a controlled rate through a hose or other conduit 14 to be deposited onto a moving release support 16. Release support 16 will usually be a release paper which may either have a plain surface or a textured surface onto which the foam mixture is deposited. If the upper surface of the release paper onto which the foam mixture is deposited has a textured finish, the resulting foam sheet will have an embossed surface corresponding to the texture of the release paper. The release paper is played out from a supply roll 18 and is pulled to the right by rolls 20 and 22 to pass by various stations in the system, and, generally, is ultimately rewound on take up roll 24. In addition to being paper, support material 16 may be a thin sheet of metal such as stainless steel or of composite materials; it may have a release coating or be coated with a material such as a urethane film which transfers to the surface of the foam. If desired, the support material may be a substrate of fibrous or other material which becomes laminated to and forms part of the final product instead of being separated from the foam and being rewound on take up roll 24. Alternately, the release support could also be a conveyor belt.

As a release paper 16 is moved to the right with the foam material deposited thereon, the foam is spread to a layer of desired thickness by a doctoring blade 26 or other suitable spreading device. A simple knife over table doctoring blade as shown, or other more complex spreading devices such as a knife over roller coasters or three or four roll reversible coaters may be employed. Doctoring blade 26 spreads the foam material to the desired thickness which will typically be in the range of from 0.01 to 0.50 inches. Depositing the foam material on the release paper and doctoring it to the desired gauge are represented in step C in FIG. 2.

The assembly of the release support and the gauged layer of foam is then delivered to a heating zone which consists of spaced apart lower and upper heating platens 28 and 30. Platens 28 and 30 may be parallel and have an equi-distant spacing therebetween along their entire lengths, or they may be slightly diverging from the entrance 32 to the exit 34. If the upper layer of the foam directly opposite to heating platen 30 is not covered with another layer of release paper or laminate material (as will be discussed hereinafter) then the spacing between platens 28 and 30 will be slightly greater than the doctored thickness of the layer of foam material and release support 16 so that the unexposed upper surface of the foam does not contact heating platen 30. The heating platens are heated by electric heating elements 36, which may be separately controlled to provide incremental heating. Platens 28 and 30 may be simple platens as shown, or each may be made up of two or more separate platens, any of which may have separate electrical heating elements to provide zones of different temperatures.

As the assembly of release paper 16 and the gauged layer of frothed material passes through the heat zone between platens 28 and 30, there is direct conduction heating of the froth layer from platen 28 which is in direct contact with release paper 16. In addition, heating platen 30 may be spaced as close as desired above the upper surface of the froth layer as long as it does not contact the uncovered upper layer of the material and thus provides a substantial amount of radiant heating as well as some convection heating to the froth sheet. During this heating step, which is depicted as step D in FIG. 2, the froth material is cured in known fashion by the promotion of polymerization whereby a cured polyurethane foam is produced. The temperatures of platens 28 and 30 are maintained in a range from about 200° F. to about 450° F. depending on the composition of the foam material. These platens may be maintained at equal or unequal temperatures depending on the particular nature of the curing process desired to be effected. For example, as will be discussed hereinafter, differential temperatures can be established for purposes of forming an integral skin on one layer of the foam or for laminating a relatively heavy layer to the foam.

After the assembly is heated, it is then passed to a cooling zone where it is cooled, in step E, by any suitable cooling device such as fans 38. The final step of the process, step F involves the removal of release paper 16 and taking it up on roll 24. The removal of the release paper leaves as a final product the cured polyurethane foam. This final product is then taken up on roll 40 for storage and use as desired. The polyurethane foam product produced by the process described will be a foam sheet of uniform gauge. The gauge is easily controlled by the doctoring blade since there is no reactive expansion of foaming material during the curing process. The only expansion during the curing process is heat induced expansion of the air bubbles in the foam mixture, the total amount of which can be easily calculated in advance to provide close control on the gauge of the finished product. The density of the finished product is also relatively uniform because the conduction and radiant heating during the curing process provides for relatively even heat distribution across the foam sheet, at least for sheets up to 0.50 inches thick.

A variant on the process described above is in the formation of an integral thick skin on one or both surfaces of the foam sheet. To form a thick skin, i.e. a skin of a high density, as an integral part of the foam sheet, the rate of heating of the foam material at platen 28 may be rapidly increased. This rapid heating reduces the viscosity and collapses some of the bubbles of the foam, thereby draining the liquid to the release paper 16 where it rapidly jells and forms a high density skin. The skin thickness can be adjusted by varying the rate of heat introduction into the foam layer from platen 28. A high density skin may be formed on the upper surface of the foam facing platen 30 by increasing the rate of heat introduction to the form layer from platen 30 resulting in foam drainage, collapse and coalescence of bubbles at the upper surface of the foam, to form a thin liquid layer which jells to form a high density skin.

Figure 2:
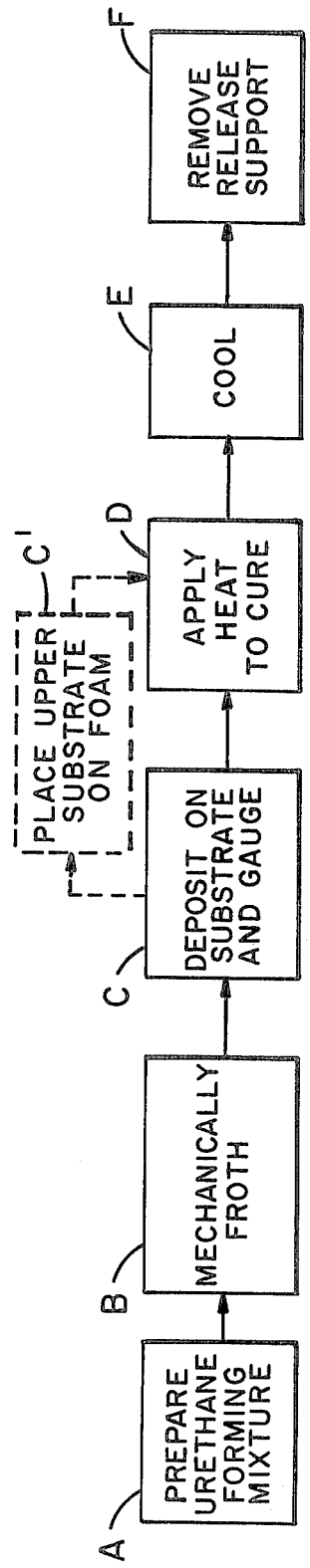
FIG. 2 is a flow diagram of the method of the present invention.

Still another variation of the present invention involves forming a laminate of the foam material with fibers or other material. In this embodiment a sheet 42 which may be a woven, knitted or non-woven fabric or other material is played off a supply roll 44 and is applied to the upper surface of the foam material prior to entering between heating platens 28 and 30. This sheet contacts the upper surface of the foam material and is bonded to the foam during the curing process to form a fabric-foam laminate. Step C' in FIG. 2 shows this available alternate step of placing the upper fibrous layer on the foam before passing through the heating zone. In forming the laminate configuration, it is important to note that platen 30 is movable with respect to platen 28 so that the spacing between platens 28 and 30 can be adjusted. Thus, it is possible to select the separation between the platens so that the froth layer expands during heating to obtain full pressurized contact between the sheet 42 and the opposed surface of upper heating platen 30. Further heating of the foam material results only in a very slight compression of the air contained within the cells of the foam. The foam molds to and fills any irregularities in the fabric surface in contact with the foam layer so that such irregularities are taken up and accommodated in the foam layer with a resultant product of uniform gauge rather than being perpetuated into the final product which would otherwise be of irregular gauge. if desired, a second release paper 48 may also be played off a roll 50 simultaneously with sheet 42; this release paper would be positioned between sheet 42 and platen 30 and would be separated after cooling station 38 and taken up on roll 52.

As a further variant to achieve gauge control, the upper surface of the foam may be covered only with release paper 42, and the separation of the platens 28 and 30 can be selected and/or adjusted during non-laminating processing so that the upper release paper 42 on the upper surface of the foam contacts platen 30. Of course, release paper 16 contacts lower platen 28. Heating of the foam results only in slight pressurization of the air cells in the foam without changing the thickness of the foam sheet. Thus, further assurance of gauge control of the non-laminated polyurethane foam sheet can be achieved.

In forming a laminate with the foam material, problems of collapsing the foam layer may be encountered if an upper laminate sheet is too heavy. To eliminate this problem, a prejelling station, in the form of an infrared heater 46 upstream of the heating platens, preheats the upper surface of the foam layer to partially or fully jell the upper surface of the foam layer prior to applying the upper fabric or other laminate layer. This preheating promotes partial cross-linking of the foam material to support the weight of the relatively heavy laminate layer without impairing the thickness of the foam layer. Furthermore, as indicated above, sheet 16 may also be a laminate sheet which forms part of the final product taken up on roll 40 rather than being separated and taken up on roll 24.

There are several distinct advantages to producing frothed foam materials in accordance with the process of the present invention. One of the most important advantages is that of significantly improved energy efficiency. Since one or both of the heating platens directly contact release paper or laminate layers in direct contact with the foam layer to heat the foam by conduction, the inefficient process of convection heating in the prior art is eliminated and replaced with conduction and radiant heating as the principal heating methods. The elimination of the inefficient convection heating of the prior art may manifest itself as (a) reduced energy requirements to effect cure, or (b) faster machine speed with energy input equivalent to the slower speeds of the prior art or (c) less expensive equipment required to produce amounts of material at rates equivalent to the prior art processes. In addition, improved gauge control, improved integral skin formation, and improved lamination, as described above, are achieved by the present invention.

The following examples, while not required to complete the disclosure of the present invention, are presented for purposes of illustration:

EXAMPLE 1

A urethane forming composition was prepared in accordance with the teachings of U.S. Pat. No. 3,772,224 consisting of (a) a prepolymer composed of toluene diisycyanate and an $\epsilon$-caprolactone based diol, and (b) a mixture of components comprised of (1) a glycerine started acrylonitrile modified triol, (2) an $\epsilon$-caprolactone based diol, (3) dipropylene glycol, (4) a trimethylsiloxy-silicate copolymer, (5) inert fillers, (6) a metallic catalyst, and (7) tetramethylene butane diamine was processed through a 4 inch SKG Industries frothing machine as follows:

The (a) component flow rate was 44.8 grams per minute; the (b) component flow rate was 200 grams per minute; the gas that was frothed into the liquid was air which had been dried to a dew point of −40° F.; the mixer speed was 390 rpm; the froth discharge pressure varied from 75 to 90 psi while froth density varied from 23 to 20 pounds per cubic foot. The froth was spread onto S. D. Warren EHR Hicalf release paper using a knife over roll coater on which the knife was set 0.135 inches above the roll. The release paper was pulled over two electrically heated lower platens at a speed of 8 feet per minute. The first platen, which was 4 feet in length, was controlled to 300° F. while the second platen, which was 8 feet in length, was controlled in each of three successive zones to 325°, 325°, and 330° F., respectively, in the direction of advance across the platen. Above the two platens, separated by 4 inches from the bottom platens, were upper platen assemblies which were controlled to temperatures of 350°, 375°, 385° and 385° F. respectively.

The release paper was removed at the end of processing, and such processing resulted in a cured polyurethane foam of 0.125 inches thickness which was resilient and of uniform thickness. It was suitable for use as a cushion insoling material for shoes.

EXAMPLE 2

A urethane forming mixture identical in composition to that of Example 1 was prepared on an SKG Industries frothing machine as in Example 1. Mixer head speed was 320 rpm. The flow rate of the (a) component was 96 grams per minute, and the flow rate of the (b) component was 426 grams per minute. A froth having a density of 53 pounds per cubic foot was dispensed at 60 psi on to a 0.100 inch thick nitrile rubber/cellulose fiber board which was in contact with the lower heating platen and which was moving at 4 feet per minute. The froth was doctored to a thickness of 0.135 inches. An infrared preheating panel was set at 800° F. and the heated lower platens, which consisted of a 4 foot segment and an 8 foot segment, were all set at 350° F. The top heating platen was controlled at 290° F. and was spaced 4 inches above the lower platen. The foamboard composite was drawn through the preheating station and then through the platens. The resulting product was a laminate of the nitrile/cellulose board and a urethane foam. The foam was tightly bonded to the board and was soft and resilient. The composite material was suitable fur use as a cushion insole in a shoe.

EXAMPLE 3

A urethane forming mixture identical to that of Example 2 was dispensed at a rate of 124.2 grams per minute on to a sheet of S. D. Warren EHR Chevreau release paper which was moving at 5 feet per minute while in contact with the electrically heated platen assembly. The urethane froth was introduced on to the paper at a density of 43 pounds per cubic foot and was doctored using a knife over roll coater so as to leave a 0.040 inch coating on the paper. The froth was passed under an infrared preheating station at 500° F. After passing the infrared preheating station, a 2 ounce per square yard acrylic bonded polyester fiber nonwoven fabric web was contacted with the top surface of the froth prior to entrance between the platens which were spaced 4 inches apart. The lower platen assembly had a first 4 foot section at 300° F. and a second 8 foot section with three successive heating zones at 300°, 325° and 325° F., respectively in the direction of advance across the platen. The upper platen assembly was set at 375° F. At the end of processing, the release paper was removed, and the resulting product was a firmly bonded composite of the nonwoven fabric and the foam layer and was suitale for use as a shoe lining material.

Using the process of the present invention on pilot plant equipment, foam material up to $\frac{1}{8}$ inch thick has been processed at rates of from 3 to 30 feet per minute with operating temperatures of the heating platens ranging from 250° F. to 300° F., and production rates up to 60 feet of foam sheet material per minute or possibly more are contemplated depending on the thickness of the material which could range up to 0.05 inches. Any direct comparison with prior art processing techniques must depend on a number of factors such as chemical composition of the foam, foam thickness and density, and the specific type of prior art equipment. However, for a given material the production rates of the present invention are achieved with substantially less heat input (in BTU's) than would be required for the same production rates using conventional circulating oven casting units.

While preferred embodiments have been shown and described, it will be understood that various modifications and substitutions may be made thereto without departing from the spirit and scope of the invention. Accordingly, the present invention has been described by way of illustration and not limitation.

What is claimed is:

1. A continuous casting process for producing flexible polyurethane foam having an integral skin on at least one surface thereof including the steps of:
   preparing a mechanically frothed mixture of a urethane foaming material;
   depositing said mixture on a first surface of a movable support sheet and forming a layer of said material to a desired thickness;
   preheating the upper surface of said doctored layer of material to at least partially gel said upper surface;
   passing said preheated layer of material and the support sheet between a pair of spaced apart heating platens, one of said platens being in contact with the second surface of said support sheet and the other of said platens being spatially separated from the upper surface of said layer of material, to heat the upper surface of said layer by radiation and convection and to heat the lower surface of said layer by conduction;

independently controlling the temperatures of said platens to produce curing of said layer of material and to cause a rate of heat transfer to at least the upper surface of said layer of material above that required for normal curing of said material whereby a cured polyurethane foam having an integral skin on said upper surface thereof is produced;

cooling said cured polyurethane foam; and taking up said cured polyurethane foam in a roll for storage or use.

2. The process of claim 1 further comprising the step of:

separating said support sheet from said cured polyurethane foam subsequent to cooling.

3. The process of claim 1 wherein:

said support sheet is bonded to said foam during heating to form a laminate.

4. The process of claim 1 wherein the step of preheating comprises:

exposing the upper surface of said layer of material to infrared radiation.

5. The process of claim 1 wherein said step of controlling the temperature of the platens includes:

maintaining the platen which is in contact with the second surface of said support sheet at a lower temperature than the platen which is spatially separated from the upper surface of said layer.

* * * * *